United States Patent

Pine

[15] 3,707,330
[45] Dec. 26, 1972

[54] LIGHT BEAM GUIDING DEVICE
[72] Inventor: Marmon Pine, Des Plaines, Ill.
[73] Assignee: Jarva, Inc., Solon, Ohio
[22] Filed: Feb. 5, 9171
[21] Appl. No.: 112,953

[52] U.S. Cl. ..................356/153, 33/46 AT, 299/1, 356/154, 356/172
[51] Int. Cl. ..............................................G01b 11/27
[58] Field of Search...............356/138, 153, 154, 172; 33/46 AT; 299/1; 172/4.5

[56] References Cited

UNITED STATES PATENTS

| | | | |
|---|---|---|---|
| 3,484,136 | 12/1969 | Colson | 299/1 |
| 3,321,248 | 5/1967 | Williamson et al. | 356/153 |
| 685,455 | 10/1901 | Kinkead | 33/46 AT |

FOREIGN PATENTS OR APPLICATIONS

| | | | |
|---|---|---|---|
| 408,551 | 9/1966 | Switzerland | 33/46 AT |
| 739,825 | 5/1943 | Germany | 153/ |

OTHER PUBLICATIONS

D. Bengston, "Construction Control with Lasers," Civil Engineering, 4/68, Vol. 38, pp. 72–74.

*Primary Examiner*—Ronald L. Wibert
*Assistant Examiner*—J. Rothenberg
*Attorney*—McNenny, Farrington, Pearne & Gordon

[57] ABSTRACT

A light beam guiding device for a tunneling machine includes a light source for emitting a beam of light, a first target, and a second target. The first target includes means for passing a light pattern to the second target which is dependent upon the position of the first target relative to the light beam. The second target includes means for indicating the location of the light pattern thereon. Proper alignment of the tunneling machine relative to the light beam is determined by a predetermined light pattern from the first target falling on a predetermined location of the second target. Each target is mounted on the tunneling machine by a mounting means, each of which includes a means to adjustably position its associated target relative to the tunneling machine to compensate for machine roll.

8 Claims, 5 Drawing Figures

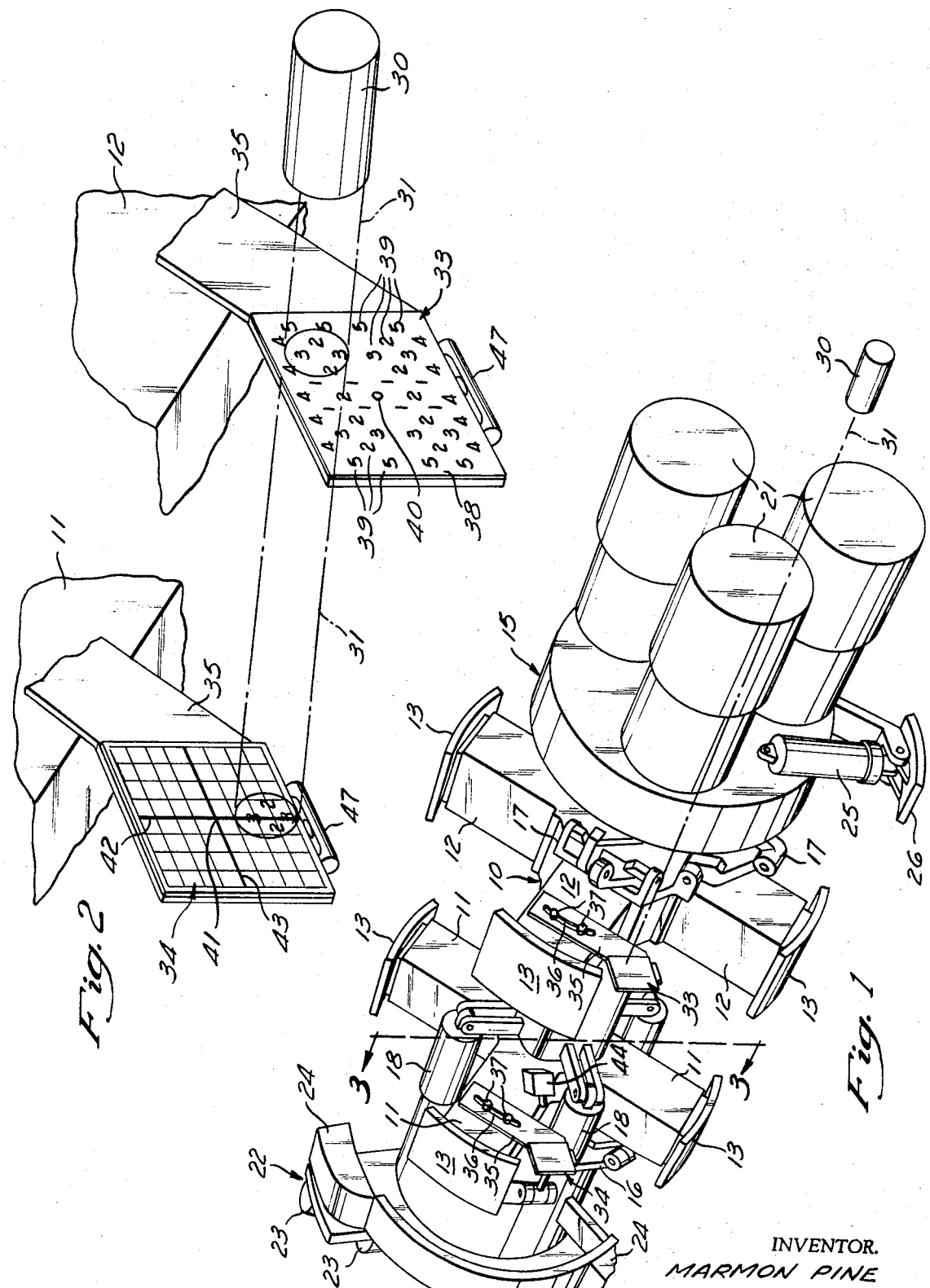

INVENTOR.
MARMON PINE
BY
McNENNY, FARRINGTON, PEARNE & GORDON

ATTORNEYS

LIGHT BEAM GUIDING DEVICE

BACKGROUND OF THE INVENTION

This invention relates generally to light beam guiding devices for guiding tunneling machines along a predetermined path.

Prior art tunneling machine guiding devices generally include a light source for emitting a beam of light along a path parallel to or angularly related to the desired direction of travel of the tunneling machine. Two targets are mounted on the machine at axially spaced locations along the light beam. Each target is provided with a reference location upon which the light beam projects when the machine is on its proper course. Any deviation of the machine from its proper course is indicated by deviation of the light beam from the reference location on one or both of the targets. The first target of such prior art light beam guiding devices may be either transparent to permit the light beam to travel to the second target, or it may be opaque. If the first target is opaque, it is removed from the path of the light beam after the position of the first target reference location relative to the light beam has been determined to permit the light beam to pass to the second target.

Although such prior art light beam guiding devices have been frequently employed for guiding tunneling machines, they are nevertheless subject to certain disadvantages. Such prior art devices require the operator to view both the first target and the second target to determine the position of each target relative to the light beam. Since it is generally advantageous to locate the two targets as far from one another as possible to provide maximum sensitivity of the guiding device, it may be impossible for the tunneling machine operator to view both targets at the same time. This may require the use of a television monitor on at least one of the targets. Alternatively, the first target may include a multiple photocell arrangement with an indicator lamp read-out panel located near the operator. This arrangement, however, requires the photocell targets to be removed from the path of the light beam to permit the light beam to pass to the second target.

SUMMARY OF THE INVENTION

These and other disadvantages of prior art guiding devices for tunneling machines are overcome by the present invention, which provides a light beam guiding device and method that indicate both target readings on a single target. This permits the operator to check the alignment of the tunneling machine by viewing only one target, and precludes the necessity of viewing two separate targets for this purpose. Furthermore, this eliminates the necessity for expensive indicating devices such as closed circuit television or photocell targets when only one of the targets may be conveniently viewed by the operator.

In a preferred embodiment, a guiding device is provided which includes a light source for emitting a beam of light, a first target means disposed on a rearward portion of a tunneling machine, and a second target means disposed on a forward portion of the tunneling machine. The first target means includes opaque means for blocking transmission of a portion of the light beam and other means for passing a light pattern which is dependent upon the position of a first target means reference location relative to the light beam. The second target means includes an indicating means for indicating the location of this light pattern relative to a second target means reference location. In this manner, by viewing only the second target means, the operator is able to determine the location of the first target means reference location relative to the light source by the particular light pattern that is projected on the second target. Furthermore, the operator is able to determine the position of the second target means reference location relative to the light beam by viewing the location that the light pattern falls on the second target.

In the preferred embodiment, the means for passing a light pattern includes first and second horizontal rows of identical reference characters spaced vertically above and below the first target reference location respectively. The means for passing a light pattern further includes first and second vertical columns of identical reference characters spaced horizontally to the right and left of the first target reference location respectively. In this manner, the image of the reference characters is projected onto the second target to indicate the location of the first target reference location relative to the light beam.

In the preferred embodiment, the guiding device further includes a first mounting means for mounting the first target on a rearward portion of the tunneling machine, and a second mounting means for mounting the second target on a forward portion of the machine. The first and second mounting means each include means for moving its associated target means along an arcuate path having a center coincident with the center line of the tunneling machine. In this manner, if the tunneling machine rolls about its longitudinal axis, the first and second targets can be moved back to their proper locations relative to the light beam so that the entire tunneling machine does not have to be releveled to use the guiding device.

The preferred method of the present invention includes positioning first and second targets in intersecting relation to the light beam at axially spaced locations along the light beam. A light pattern is defined which is dependent upon the position of the first target reference location relative to the light beam by passing a portion of the light beam through a passage of the first target means having a shape dependent upon its location relative to the first target reference location. This light pattern is then projected on the second target means, and the location of the light pattern relative to the second target means reference location is indicated by illumination of a portion of the second target.

BRIEF DESCRIPTION OF THE DRAWINGS

These and other aspects and advantages of the invention will become more readily apparent upon a full understanding of the accompanying drawings, wherein:

FIG. 1 is a schematic perspective view of a tunneling machine incorporating the light beam guiding device of the present invention;

FIG. 2 is an enlarged cut-away view of the targets of the guiding device shown in FIG. 1, with the reference location of each target off-set from the light beam;

DESCRIPTION OF THE PREFERRED EMBODIMENT

Figure 3:
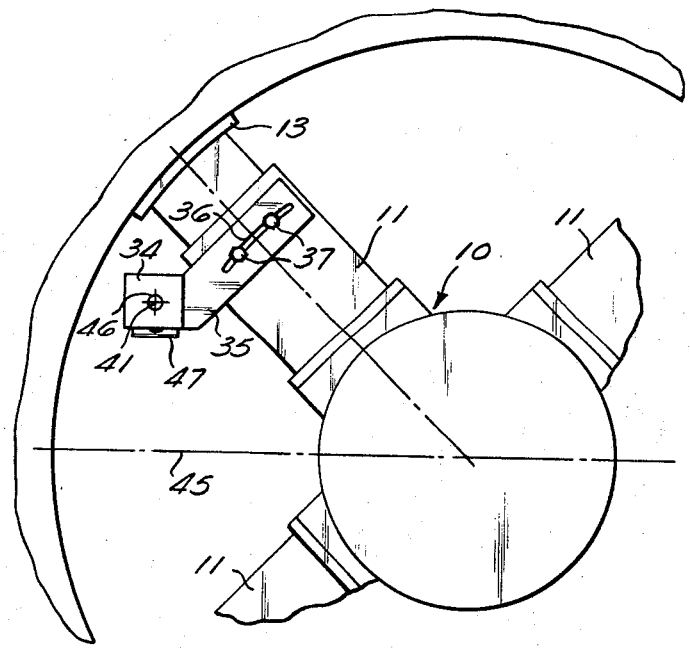
FIG. 3 is a view taken generally along reference view line 3—3 of FIG. 1, with portions removed for clarity.

Referring now to the drawings in greater detail, FIG. 1 shows a tunneling machine, the structure and operation of which are shown and described in detail in U.S. Pat. No. 3,383,138. The tunneling machine includes a stationary support frame 10 having a forward set of four support feet 11 and a rearward set of four support feet 12. The support feet 11 and 12 are each provided with hydraulically actuated radially extensible support pads 13 for gripping the side walls of a tunnel to secure the support frame 10 therein. A movable frame 15 is carried by the support frame 10 by four forward torque arms 16 and four rearward torque arms 17. Four power cylinders 18 provide the force to move the movable frame 15 axially with respect to the support frame 10. Three electric motors 21 are mounted on the movable frame 15 to provide the driving torque for a cutter head assembly 22. The cutter head assembly 22 is provided with a plurality of roller cutters 23 for cutting the tunnel end face when the cutter head 22 is pushed thereagainst by the power cylinders 18. Muck removal buckets 24 are mounted on the cutter head 22 for removing the particles which fall to the bottom of the tunnel. Two lift cylinders 25 and lift pads 26 are provided at the rearward end of the movable frame 15 for supporting the rearward portion of the movable frame 15 when the support pads 13 are retracted.

To provide a method and means for maintaining the tunneling machine on a predetermined path, a light beam guiding method and device are provided which include a light source 30 for emitting a high intensity light beam indicated at 31. In the preferred embodiment, the light source 30 is a laser with a special lens which gives a large beam of substantially constant diameter in a well-known manner. The light source 30 is mounted in the tunnel, and, in the preferred embodiment, is arranged such that the light beam 31 is substantially parallel to the desired axis of the tunnel. A first target means 33 and a second target means 34 are mounted at axially spaced locations along the light beam 31 in intersecting relation therewith. In the preferred embodiment, the first target means 33 and the second target means 34 are mounted on a rear support foot 12 and a front support foot 11, respectively, by suitable mounting plates 35. Each mounting plate 35 is provided with an arcuate slot 36 which receives suitable bolts 37 for fastening to its associated support foot.

The first target means 33 includes an opaque plate 38 for blocking transmission of a portion of light beam 31 and a plurality of openings or passages, some of which are designated by reference numeral 39, for passing a light pattern which is dependent upon the position of a center reference location 40 relative to the light beam 31. Although the plate 38 is opaque in the preferred embodiment, it may, alternatively, be translucent if desired. The passage means 39 may be of any desired shape or configuration which would indicate the deviation of the light beam 31 from the center reference location 40. In the preferred embodiment, this is accomplished by utilizing a plurality of individual passages each in the general configuration of a reference numeral. As seen in FIG. 2, the reference numeral zero at reference location 40 indicates the center of the first target means 33, while the other reference numerals indicate deviations from the reference location 40. For this purpose, a plurality of vertical columns of odd numerals are positioned to the right and to the left of reference location 40 to indicate the horizontal deviation from the reference location 40. In a similar manner, a plurality of horizontal rows of even numbers are provided vertically above and below reference location 40 to indicate the vertical distance above or below reference location 40. Alternatively, target means 33 could be provided with a transparent plate and opaque reference characters.

The second target means 34 includes a reference location 41 having a vertical centerline 42 and a horizontal centerline 43 passing therethrough. A suitable grid pattern which includes horizontal and vertical lines for indicating the horizontal and vertical distance from the reference location 41 is also provided.

To operate the light beam guiding device, the light source 30 is arranged in the tunnel such that the light beam 31 is parallel to the desired direction of travel of the tunneling machine. The targets 33 and 34 are suitably arranged on the tunneling machine such that the tunneling machine will travel along the desired path when the reference locations 40 and 41 are located in the center of light beam 31. To preclude the necessity of viewing both targets to determine the location of the light beam 31 thereon, the oblique plate 38 of the first target means 33 blocks a portion of light beam 31, while the passage means 39 passes a light pattern which is dependent upon the location of the light beam 31 with respect to the reference location 40. For example, if the tunneling machine is on its proper course so that the center of the light beam 31 falls on reference location 40, a light pattern will be transmitted which has the configuration of a zero at its center. However, it the tunneling machine is off course as shown in FIG. 2 so that the light beam 31 falls on the upper right hand portion of the first target means 33, a different light pattern will be passed through the passage means 39. As shown in FIG. 2, the light pattern which is passed indicates that the light beam 31 is located horizontally to the right of reference location 40 a distance indicated by the odd numerals 3 and is located vertically above the reference location 40 a distance indicated by the even numerals 2. When this light pattern is received by the second target 34, the operator is thus able to determine the position of light beam 31 with respect to the reference location 40 of the first target means 33. By perceiving the location of the light pattern which is received by the second target 34, the operator can also determine the position of the second reference location 41 relative to the light beam 31. As shown in FIG. 2, the light pattern which is projected is located vertically below the reference location 41 a distance which is indicated by the third horizontal grid line below the horizontal centerline 43. If desired, a television monitor 44 may be provided if the operator is remotely located from the second target means 34 or if it is desired to record the light pattern on the second target means 34 as the tunnel progresses. By providing a light beam guiding device in which only a single target need be viewed by the operator, easier checking of the alignment of the tunneling machine and easier realignment when the tunneling machine deviates from its predetermined path is permitted.

Because the movable support frame 15 is securely anchored in the tunnel by the support feet 11 and 12 and the support pads 13, the tunneling machine will generally stay on its proper course as the movable frame 15 is advanced by the power cylinders 18. When the movable frame 15 has been advanced to its forwardmost position relative to the support frame 10, the lift pads 26 are displaced from the retracted position shown in FIG. 1 to an advanced position engaging the lower portion of the tunnel wall to support the rear postion of the tunneling machine. The support feet 11 and 12 are then retracted, and the power cylinders 18 are retracted to advance the support frame 10 while the movable frame 15 remains stationary in the tunnel. The details of this stepper advance structure and operation are described in detail in the above referenced U.S. Pat. No. 3,383,138. In this manner, the support frame 10 is advanced to a forward portion of the tunnel where it is again anchored in place by the support feet 11 and 12 to permit further axial advancement of the movable frame 15. When the support frame 10 is repositioned in the tunnel in this manner, or for if any reason the tunneling machine deviates from its proper path, it is necessary to realign the tunneling machine so that the center of the light beam 31 coincides with the reference locations 40 and 41 of the first and second targets. To accomplish this, the lift pads 26 are generally used to achieve the proper vertical alignment, while the support pads 13 are generally used to achieve proper horizontal alignment of the tunneling machine. Since the cutter head 22 is of the same diameter as the tunnel, the tunneling machine will pivot about the cutter head 22 as it is being aligned. When the operator has determined that the machine is properly aligned, such as would be indicated by a light pattern containing the reference numeral zero of reference location 40 at its center being projected upon reference location 41, the support pads 13 are extended outwardly to secure the support frame 10 in the tunnel.

When it is desired to change the direction of travel of the tunneling machine, the light source 30 may be repositioned in the tunnel so that the light beam 31 is parallel to the new desired direction of travel. Alternatively, rather than repositioning the light source 30, the alignment of the tunneling machine relative to the light beam 31 may be changed so that a different light pattern is projected on a different portion of the second target means 34. The desired position of the first target 33 relative to the light beam 31, which determines the light pattern that will be projected, and the desired position of the second target 34 relative to the light beam 31, which determines the location on the second target 34 at which the light pattern is projected, may be determined by using well-known geometric relationships.

Figure 4:
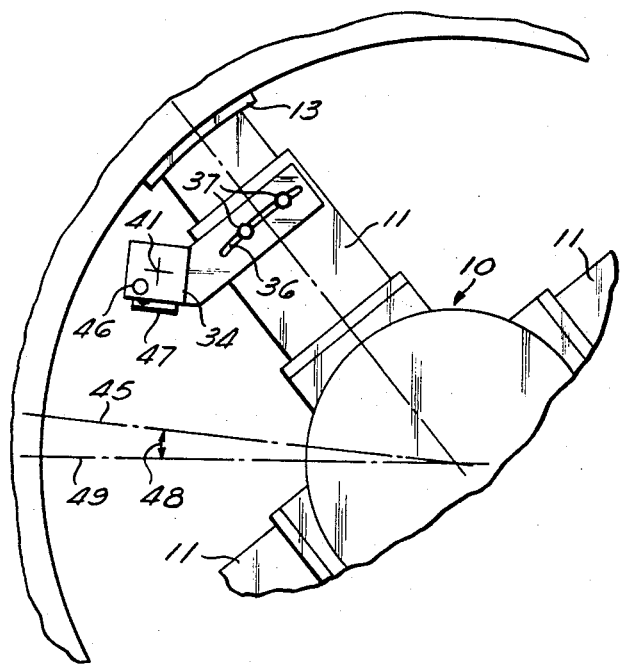
FIG. 4 is a view similar to FIG. 3, but with the tunneling machine rolled about its longitudinal axis and with the targets not adjusted for the roll.
Figure 5:
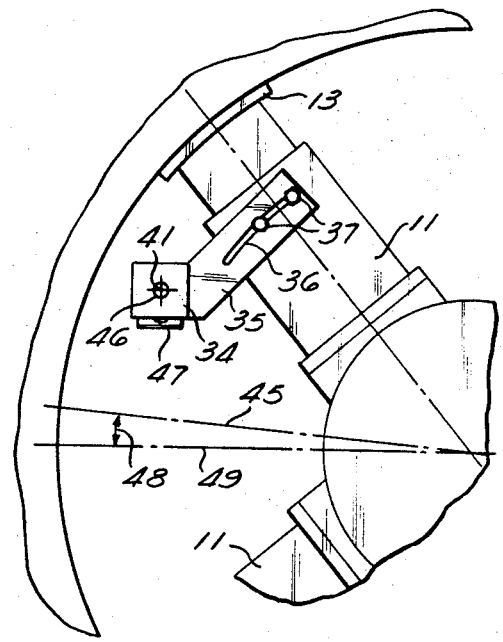
FIG. 5 is a view similar to FIG. 3, but with the tunneling machine rolled about its longitudinal axis and with the second target adjusted to compensate for the roll.

The light beam guiding device further includes a method and device for eliminating the effect of machine roll on the guiding device. As best seen in FIG. 3, the support frame 10 may be positioned in the tunnel such that the horizontal centerline 45 of the tunneling machine coincides with the horizontal centerline of the tunnel. When this happens, the second target means 34 is properly positioned so that the light pattern indicated by the circle at reference numeral 46 is projected on the reference location 41. When this occurs, a bubble level 47 indicates that the second target 34 is level. As the machine progresses through the tunnel, it may roll clockwise as viewed from the rear portion of the machine about its longitudinal axis due to the reaction torques on the support frame 10 as imposed by the movable frame 15 through the torque arms 16 and 17. When this occurs, as shown in FIG. 4, the machine will still operate properly but the second target 34 will be moved from its proper position in the tunnel. The horizontal centerline 45 of the tunneling machine will then be displaced by angle 48 from the horizontal centerline 49 of the tunnel. This causes the second target 34 to be rotated from its proper position in the tunnel about the longitudinal axis of the machine and is indicated by the liquid bubble level 47 as shown in FIG. 4. When this occurs, the light pattern 46 will not be projected on the second reference location 41, even though the tunneling machine is still on its proper course, because the target 34 has moved. To move the target back to its proper position, the clamping bolts 37 are loosened, and the support plate 35 and second target 34 are displaced about a path defined by the arcuate slot 36 to a position which the bubble level 47 indicates is the level position for the second target 34. Because the center of curvature of the arcuate slot 36 coincides with the longitudinal axis of the tunneling machine, the second target 34 is thus moved back along the same path that it traversed when the machine rolled from the position shown in FIG. 3 to the position shown in FIG. 4. This takes the second target 34 back to its proper position, and the light pattern 46 once again is projected on the reference location 41 as seen in FIG. 5. As seen in FIG. 1, the first target 33 may be repositioned in the same manner to eliminate the effect of machine roll on the first target of the light beam guiding device also.

Although a preferred embodiment of the invention has been shown and described in detail, various modifications and rearrangements may be made without departing from the scope of the invention as defined by the following claims.

I claim:

1. A guiding device for a tunneling machine comprising a light source for emitting a beam of light, first target means disposed on said tunneling machine, and second target means disposed on said tunneling machine on a side of said first target means away from said light source, said first target means including means for blocking transmission of a portion of said light beam and means for passing a portion of said light beam to said second target means, said means for blocking and said means for transmitting together defining a plurality of information bearing reference patterns on said first target means, said reference patterns defining a coordinate system for identifying the position of intersection of said light beam and said first target means said portion of said light beam which is passed to said second target means being modulated by at least one of and less than all of said reference patterns, said second target means including means for displaying a cross section of said modulated portion of said light beam, and said displayed cross section indicating the position of said first target means relative to said light beam.

2. A guiding device as set forth in claim 1 wherein said second target means includes an indicating means for indicating the location of said portion of said light beam which is passed relative to a second target means reference location.

3. A guiding device as set forth in claim 2 wherein said means for passing a portion of said light beam includes an irregularly shaped passage means for defining said reference patterns.

4. A guiding device as set forth in claim 3 wherein said irregularly shaped passage means includes a reference character shaped passage means.

5. A guiding device as set forth in claim 1 wherein said means for passing a portion of said light beam includes a first horizontal row of identical reference characters spaced vertically above a first reference location, a second horizontal row of identical reference characters spaced vertically below said first reference location, a first vertical column of identical reference characters spaced horizontally to the right of said first reference location, and a second vertical column of identical reference characters spaced horizontally to the left of said first reference location.

6. A guiding device as set forth in claim 1 including first mounting means for mounting said first target means on said tunneling machine, second mounting means for mounting said second target means on said tunneling machine, and said first and second mounting means each including means for moving its associated target means along an arcuate path having a center of curvature coincident with the longitudinal centerline of said tunneling machine.

7. A method of indicating the position of a first reference location of a first target means relative to a light beam and of a second reference location of a second target means relative to said light beam comprising positioning said first and second target means in intersecting relation to said light beam at axially spaced locations along said light beam, defining a coordinate system of information bearing reference patterns on said first target means by portions of greater and lesser transparency of said first target means for indicating the distance and the direction from said first reference location of the intersection of said light beam and first target means, defining a light pattern indicating said distance and direction by projecting at least a portion of said light beam through said first target means, said portion being modulated by at least one of and less than all of said reference patterns, and projecting said light pattern onto said second target means, whereby the intersection of said light pattern on said second target means indicates the position of said second reference location relative to said beam and said light pattern defines the position of said first reference location relative to said beam.

8. A method as set forth in claim 7 including indicating the location of said light pattern relative to said second reference location on said second target means by providing an indicating means on said second target means.

* * * * *